United States Patent Office 3,306,696
Patented Feb. 28, 1967

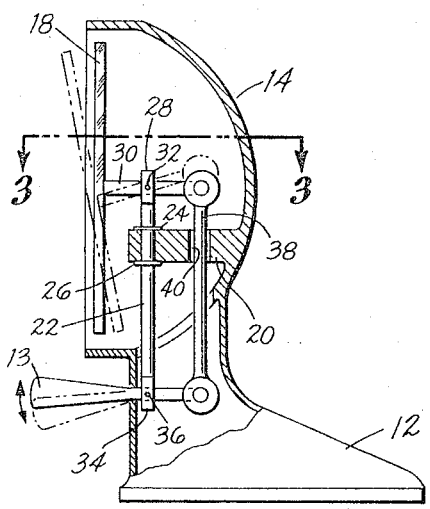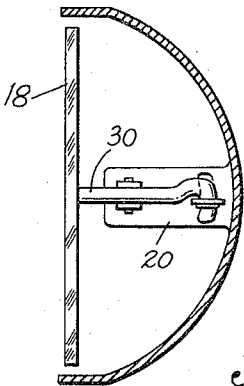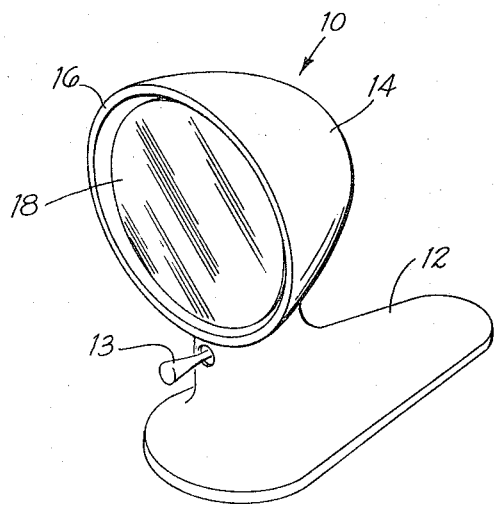

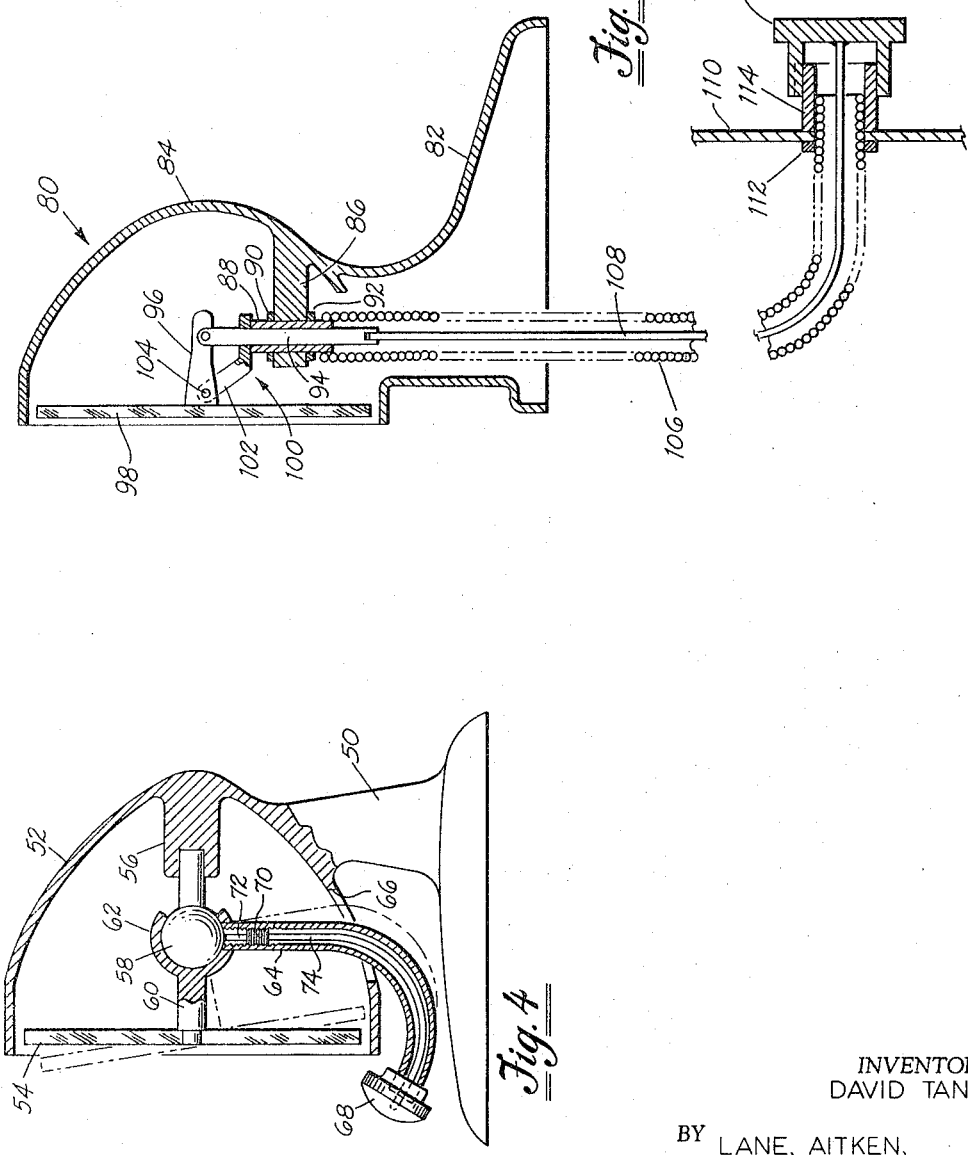

3,306,696
REMOTE CONTROL SIDE VIEW MIRROR
David Tann, 333 Covington Road, Detroit, Mich. 48203
Filed June 14, 1963, Ser. No. 287,852
16 Claims. (Cl. 350—288)

The present invention relates to rear view mirrors for automotive vehicles and more particularly to a rear view mirror which can be adjusted by a conveniently positioned actuator.

One popular type of rear view mirror is adapted to be mounted on the side of an automobile and has an attractively shaped housing which surrounds and covers the rear face of the mirror. Prior to the present invention this type of mirror was adjusted by placing the fingers on the viewing surface of the mirror to move it to the desired position which, of course, leaves fingerprints on the viewing surface, or the mirror was adjusted by rather elaborate remote control systems having an actuator positioned within the automotive vehicle. Because of their complexity, these systems significantly increased the cost of the mirror.

It is one object of the invention to provide a side view mirror of the type described above which can be controlled by a conveniently positioned actuator which is simple in construction and does not significantly increase the cost of the mirror.

It is another object of the present invention to provide a side view mirror of the type described above which can be controlled by an actuator located on the base supporting the housing surrounding the mirror so that it can be connected to adjust the mirror by a very simple linkage system.

It is a further object of the invention to provide a side view mirror controlled by a handle wherein pivotal movement of the handle about one axis pivots the mirror about the same axis and pivotal movement of the handle about a second axis perpendicular to the first axis pivots the mirror about a third axis parallel to the second axis.

It is a still further object of the invention to provide a side view mirror actuated by a handle as described above wherein the mirror can be turned from side to side by moving the handle from side to side and can be nodded up and down by moving the handle up and down.

Other objects and features of novelty of the present invention will be specifically pointed out or will otherwise become apparent when referring, for a better understanding of the invention, to the following description taken in conjunction with the accompanying drawings, wherein:

FIG. 1 is a perspective view of a side view mirror embodying features of the present invention;

FIG. 2 is a sectional view of the side view mirror illustrated in FIG. 1;

FIG. 3 is a sectional view taken along the line 3—3 of FIG. 2;

FIG. 4 is a sectional view of a modification of the present invention; and

FIG. 5 is a sectional view of another modification of the invention.

Referring to FIG. 1, a side view mirror 10 is shown which comprises a base 12 adapted to be mounted on the body of an automotive vehicle and a housing 14 supported on the base. The housing has an enlarged cylindrical opening 16 on one side thereof, and a mirror 18 is positioned within the cylindrical opening and mounted for limited universal movement, as will be described, to enable the operator to properly align the mirror for viewing automobiles approaching from the rear. In accordance with the present invention a handle 13 projects from the base 12 immediately beneath the housing 14 and is connected by suitable linkages concealed within the base and housing so as to sweep the mirror from side to side when the handle 13 is pivoted from side to side and to nod the mirror up and down when the handle is pivoted up and down.

Referring to FIGS. 2 and 3 the manner in which the mirror 18 is mounted for limited universal movement and the construction of the concealed linkages can be seen more clearly. It will be observed that a support 20 projects from the rear inside surface of the housing 14 in position to rotatably support a shaft 22. An upper shoulder 24 and lower shoulder 26 are fixed on the shaft 22 on opposite sides of the support 20 to fix the shaft against axial movement. A clevis 28 is formed on the upper end of the shaft in position to receive an arm 30 projecting from the rear face of the mirror 18. The arm 30 extends through the clevis and is pivotally connected thereto by a pin 32 or the like. The handle 13 extends through a similar clevis 34 on the lower end of the shaft 22 and is pivotally connected thereto by a pin 36. A link member 38 extends through an arcuate slot 40 in the support 20. The upper end of the link is pivotally connected to the projecting end of the arm 30 and the lower end of the link is pivotally connected to the corresponding end of the handle 13, the pivot axes at the upper and lower ends of the link 38 being parallel to the pivot axes defined by the pins 32 and 36.

With this construction the handle 13 can be pivoted up and down about the pivot axis defined by the pin 36 to raise and lower the link member 38 and thus pivot the mirror 18 about the pivot axis defined by the pin 32 to make it nod up and down. When the handle 13 is pivoted from side to side, it rotates the shaft 22 to make the mirror sweep from side to side. The clevis 28 can engage the arm with a predetermined frictional drag and friction can also be introduced at the bearing surface of the shaft to make certain the mirror will stay in its adjusted position. Thus the present invention provides a very simple construction for adjusting the mirror without requiring the operator to place his fingertips on the viewing surface of the mirror. No ball joints are required and the mirror can be mass produced for about only fifteen to twenty cents more than the cost of the conventional mirror without the actuating mechanism.

The mirror of the present invention is preferably mounted on the forward edge of the door of the automotive vehicle so that the operator can adjust it by simply reaching out the window to actuate the handle 13. With the mirror in this position, it is also apparent that other actuating devices could be connected to the bottom of the shaft 22 and link 38 in place of the handle 13 to enable the shaft to be rotated and the link to be raised and lowered from a lever or knob mounted on the inside of the door. If this were done the added linkages would extend through the door and up through the bottom of the base 12 so as to be concealed from view.

Referring to FIG. 4, a modification of the present invention is illustrated. It comprises a base 50 having a housing 52 mounted thereon for enclosing a mirror 54 as in the first embodiment. A support 56 projects inwardly from the rear wall of the housing 52 in position to support a ball 58 centrally within the housing 52. An arm 60 projects from the rear face of the mirror 54 and has a socket 62 on the end thereof which fits about the ball 58 to mount the mirror 54 for limited universal movement. The upper end of a rigid tube 64 is fixed to the socket 62 and the tube projects through an enlarged opening 66 in the wall of the housing 52 with the other end thereof curving outwardly into position to rotatably support a knob 68.

A set screw 70 having a reduced end portion 72 is provided for frictionally engaging the ball 58 to lock the socket 62 against movement. The upper end of the rigid tube 64 is internally threaded to receive the set screw 70 and the tip of the reduced end portion 72 which engages the ball 58 may be provided with a layer of nylon or the like so that it won't mar the surface of the ball 58. The set screw 70 is tightened and released by a flexible wire 74 positioned within the rigid tube 64 and having the upper end thereof fixed to the set screw 70 and the lower end thereof fixed to the knob 68.

With this construction the knob 68 can be rotated relative to the rigid tube 64 to rotate the flexible wire 74 to loosen the set screw 70. After the set screw has been loosened, the mirror 54 can be moved to any desired position by simply moving the knob from side to side or up and down, the opening 66 in the wall of the housing 52 being large enough to allow for the necessary movement of the rigid tube. After the mirror has been moved to the desired position, the knob 68 can be rotated relative to the tube 64 to lock the mirror in the desired position.

Referring to FIG. 5, a side view mirror 80 is shown which is similar to the embodiment illustrated in FIGS. 1–3 with the principal exception that the rotatable shaft and pivoting arm for swiveling the mirror are controlled by an actuator which can be positioned inside the automobile. The mirror 80 comprises a base 82, housing 84 and a support 86 projecting from the rear wall of the housing in position to rotatably support a shaft 88 fixed against actual movement by shoulders 90 and 92 as in the embodiment of FIGS. 1–3. A link 94 slidably extends through the shaft 88 with the upper end thereof pivotally connected to an arm 96 fixed to and projecting from the rear face of the mirror 98. A clevis 100 is mounted on the upper end of the shaft 88 and has a pair of arms 102 angling upwardly and pivotally connected to the arm 96 by a pin 104.

With this construction the mirror 98 can be swept from side to side by rotating the shaft 88, and nodded up and down by reciprocating the link 94. However, in this embodiment a flexible cable 106 is provided for rotating the shaft 88 and a flexible wire 108 which extends through the flexible cable 106 is provided for reciprocating the link member 94. The upper end of the flexible cable is fixed to the lower end of the shaft 88, and the lower end of the cable extends through a wall or panel 110 which may be the dashboard or the inside panel of the front door of an automobile, for example. A washer 112 is fixed to the lower end of the flexible cable on one side of the panel 110 and an externally splined sleeve 114 is fixed to the lower end of the flexible cable on the other side of the panel 110. With this arrangement the flexible cable is free to rotate relative to the panel 110 but is fixed against axial movement relative thereto.

A knob 116 is slidably keyed to the splined sleeve 114 for rotating the flexible cable 106. The end of the wire 108 is fixed to the knob 116 so as to reciprocate the link member 94 when the knob 116 is moved in and out on the splined sleeve 114. With this construction the mirror 98 can be swept from side to side and nodded up and down by simply rotating the knob 116 or moving the knob in and out. In addition by virtue of the flexible cable 106 and wire 108, the mirror 80 can be mounted in any suitable position on the car, such as the side of the front door, or even forwardly on the front fender of the automobile, and the knob 116 can be located at some convenient point within the car for actuation by the driver.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, although the link member 94 provides an advantageous connection between the flexible wire 108 and the end of the arm 96, it is apparent that the link member can be eliminated and the flexible wire extended through the shaft 88 and pivotally connected directly to the end of the arm 96 to nod the mirror up and down in response to reciprocation of the flexible wire.

What is claimed is:
1. A side view mirror comprising a base, a housing rigidly mounted on said base having an enlarged opening therein facing away from the base, a support fixed within said housing adjacent to said opening, a mirror positioned within said opening, means for mounting said mirror on said support for limited universal movement relative to the housing and actuating means operatively connected to said mirror mounting means for swiveling the mirror to a desired position, a portion of said actuating means extending through the wall of said base to an exposed position immediately adjacent thereto so that it can be conveniently actuated by an operator to position the mirror without touching the mirror surface.

2. A side view mirror comprising a base adapted to mount said mirror on the body of a vehicle, a mirror, means for mounting said mirror on said base for limited universal movement, a housing fixed to said base and surrounding the periphery of said mirror and defining a chamber behind the mirror for concealing said mirror mounting means, said base having a cavity therein communicating with said chamber, actuating means projecting from said base, and linkage means connecting said actuating means to said mirror mounting means for enabling the mirror to be swiveled by said actuating means, a portion of said linkage means being positioned within said cavity and the remainder of said linkage means being positioned within said chamber whereby the linkage means is concealed from view.

3. A side view mirror comprising supporting means, a shaft rotatably mounted on said supporting means, a mirror, means for pivotally mounting a mirror on one end of said shaft for pivotal movement about an axis perpendicular to the shaft, handle means pivotally mounted on the other end of said shaft for pivotal movement about an axis parallel to said first-mentioned axis, and link means connected between said handle means and mirror mounting means for pivoting said mirror about said first-mentioned axis in response to pivotal movement of said handle means about said second-mentioned axis, said shaft being rotatable by said handle means to rotate said mirror about the axis of the shaft.

4. A side view mirror comprising a base adapted to be mounted on the body of a vehicle, a shaft mounted for rotation relative to said base, a mirror having an arm projecting from the rear face thereof, means for pivotally mounting said arm at a point intermediate the ends thereof on one end of said shaft, handle means, means for pivotally mounting said handle means at a point intermediate the ends thereof on the other end of said shaft for pivotal movement about an axis parallel to the pivot axis of said arm, and a link pivotally connecting the projecting end of said arm to the corresponding projecting end of said handle whereby pivotal movement of said arm about its axis of pivot pivots the mirror about the pivot axis of the arm and pivotal movement of the handle about the axis of the shaft rotates the shaft to rotate the mirror about the axis of the shaft.

5. A side view mirror comprising a base, a housing mounted on said base having an enlarged opening therein, a support fixed within said housing, a shaft rotatably mounted on said support intermediate the ends of the shaft, a mirror positioned within said opening, an arm projecting from the rear face of said mirror and pivotally connected to one end of said shaft at a point intermediate the ends of said arm for pivotal movement about an axis perpendicular to said shaft, the other end of said shaft projecting through the wall of said housing, handle means pivotally connected to said other end of said shaft for pivotal movement about an axis parallel to said first-mentioned axis, and link means extending through said wall for pivotally connecting said handle means to said arm whereby pivotal movement of said handle pivots said mirror about said first-mentioned axis and pivotal movement of said handle about the axis of the shaft rotates the shaft to rotate the mirror about the axis of the shaft.

6. The invention as defined in claim 5 wherein said support projects from the wall of the housing toward the back face of said mirror, and has a slot therethrough through which said link means extends, said slot being wide enough to accommodate the swinging movement of said link which occurs when said shaft is rotated.

7. The invention as defined in claim 6 wherein the other end of said shaft and the portion of said link means projecting from said housing are concealed within said base.

8. An adjustable side view mirror comprising supporting means, a ball fixed to said supporting means, a socket journalled on said ball for limited universal movement relative thereto, a mirror fixed to said socket for movement therewith, a rigid tube having one end fixed to said socket, a knob rotatably mounted on the other end of said rigid tube, a set screw threadably mounted within said one end of the rigid tube in position to be advanced against said ball when rotated, and a flexible wire extending through said rigid tube with one end thereof fixed to said set screw and the other end thereof fixed to said knob so as to rotate the set screw by rotating the knob.

9. A remotely controlled side view mirror comprising supporting means, an element rotatably mounted on said supporting means, a mirror pivotally connected to said element for pivotal movement about an axis perpendicular to the axis of rotation of said element, a flexible cable fixed to said element for rotating the element in response to rotation of the cable, and flexible wire actuated means extending through said cable and element for pivoting said mirror about said first-mentioned axis.

10. The invention as defined in claim 9 wherein said flexible wire actuated means comprises a link member slidably extending through said element, means for pivotally connecting one end of the link member to said mirror for pivoting the mirror about said first-mentioned axis in response to reciprocation of the link member, and a flexible wire extending through said cable and fixed to the other end of said link member for reciprocating said link member when the wire is pushed or pulled.

11. The invention as defined in claim 10 including means for rotatably journalling the other end of said flexible cable and fixing it against axial movement, and actuator means connected to said other end of the flexible cable and said other end of the flexible wire for rotating the flexible cable and reciprocating the flexible wire relative to the cable.

12. A remotely controlled side view mirror comprising supporting means, an element rotatably mounted on said supporting means, a mirror, means pivotally connecting said mirror to said element for pivotal movement about an axis perpendicular to the axis of rotation of said element, and a flexible cable element having a flexible wire element extending therethrough, said flexible elements being slidable and rotatable relative to one another with one end of one of said flexible elements connected to said rotatable element for rotating the rotatable element in response to rotation of the flexible element and one end of said other flexible element being connected to said means for pivoting said mirror about said first-mentioned axis in response to reciprocation of said other flexible element, and means connected to the other end of said flexible elements for rotating said one flexible element and reciprocating said other flexible element.

13. An adjustable side view mirror comprising supporting means, a ball-like element fixed to said supporting means, socket means journaled on said ball-like element for limited universal movement relative thereto, a mirror fixed to said socket for movement therewith, a rigid elongated element having one end fixed to said socket and the other end located in position to be hand-actuated for swiveling the mirror on the ball-like element to adjust its position, locking means mounted on said rigid element adjacent to said one end of the rigid element for locking said socket against movement relative to said ball, and lock actuating means adjacent to the other end of said rigid element for actuating said locking means.

14. A side view mirror comprising a base, a housing rigidly mounted on said base having an enlarged opening therein facing away from the base, a support fixed within said housing adjacent to said opening, an element rotatably mounted on said support, a mirror positioned in said opening, means for pivotally mounting said mirror on said element, and hand-actuated control means connected to said element and to said mirror mounting means for rotating said element when moved in one direction and a direction opposite thereto and pivoting said mirror mounting means when moved in another direction and a direction opposite thereto.

15. The invention as defined in claim 14 wherein said actuating means comprises a hand actuator, means for connecting said actuator to said element to rotate the element when the actuator is pivoted about the axis of rotation of said element, and means for connecting said actuator to said mirror mounting means to pivot said mirror when the actuator is pivoted about an axis extending perpendicularly through said axis of rotation.

16. The invention as defined in claim 14 wherein said actuating means comprises a hand actuator, means for connecting said actuator to said element to rotate said element when said actuator is rotated and means for connecting said actuator to said mirror mounting means to pivot said mirror when the actuator is reciprocated along its axis of rotation.

References Cited by the Examiner

UNITED STATES PATENTS

| | | | |
|---|---|---|---|
| 1,284,818 | 11/1918 | Toepfer | 240—61.6 |
| 2,315,260 | 3/1943 | Lancaster | 88—98 |
| 2,947,856 | 8/1960 | Fox | 240—61.5 X |
| 2,962,933 | 12/1960 | Hezler | 74—501 X |

MILTON KAUFMAN, *Primary Examiner.*